Feb. 16, 1932.  H. G. WEYMOUTH  1,845,536
WATER METER
Filed Nov. 19, 1928   2 Sheets-Sheet 1

Inventor
Harry G. Weymouth
William A. Strauch
By
Attorney

Feb. 16, 1932.                H. G. WEYMOUTH                1,845,536
                                  WATER METER
                              Filed Nov. 19, 1928        2 Sheets-Sheet 2
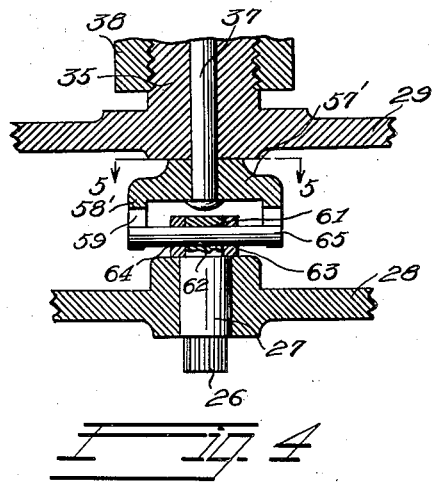
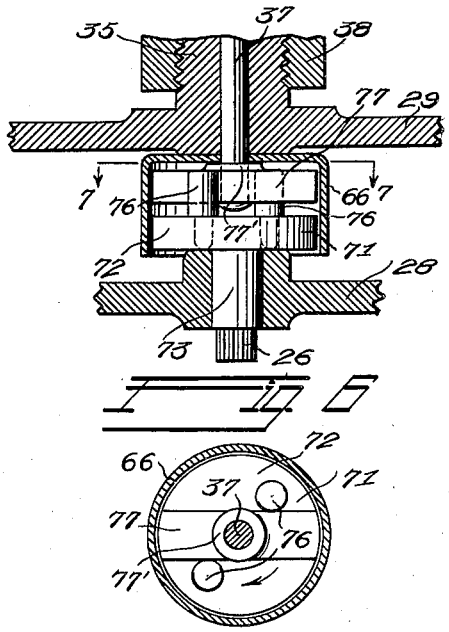
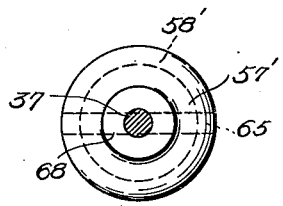
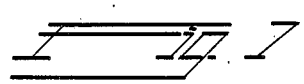
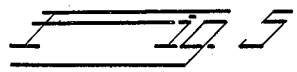
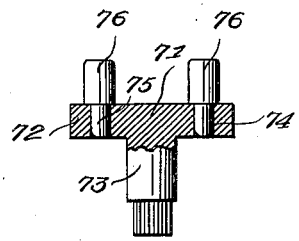
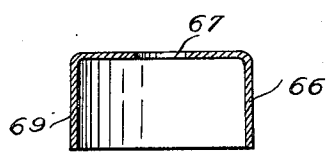
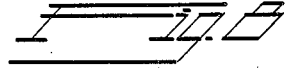
Inventor
Harry G. Weymouth
By William A. Strauch
Attorney Patented Feb. 16, 1932

1,845,536

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

WATER METER

Application filed November 19, 1928. Serial No. 320,430.

The present invention relates to water meters, and more particularly to anti-freeze constructions for water meters.

Water meters adapted for use in extremely cold climates have been heretofore proposed that embody certain constructions for preventing serious damage to the mechanism of the meter upon freezing of water within the meter casing. Such prior meters however embody a drive connection between the reduction gearing and the indicating mechanism including elongated cranks or dogs surrounded by water, and which, upon freezing of the water have their movement checked so that the gears of the reduction gearing frequently turn loose on their driving spindles or shafts seriously impairing the operation of the meter.

A primary object of the present invention is to provide a water meter construction in which the tendency to break down the driving connections between the gears and shafts is minimized.

Another object of the present invention is to provide means for cooperation with the stuffing box crank and dog crank of a water meter to prevent cessation of movement of said cranks upon the freezing of water in the meter.

Still another object of the present invention is to provide a stuffing box crank shaped to prevent cessation of movement upon accumulation of ice in the meter.

It is a still further object of the present invention to provide novel anti-freeze constructions for liquid meters that are simple in construction, effective in operation and which can be manufactured at relatively low cost.

With the above objects in view as well as others that will become apparent from the following disclosure, reference will be had to the accompanying drawings forming a part thereof and in which:

Figure 4 is a fragmental longitudinal sectional view of a meter showing the application of still another embodiment of my invention.

Figure 5 is a sectional view taken on line 5—5 of Figure 4.

Figure 6 is a view similar to Figure 4 disclosing the application of a further modification of my invention.

Figure 7 is a sectional view taken on line 7—7 of Figure 6.

Figure 8 is a detail of the construction illustrated in Figures 6 and 7 partly in section and partly in elevation.

Figure 9 is a vertical sectional view of a cup member or thimble sleeve comprising one of the elements of my invention.

Figure 1:
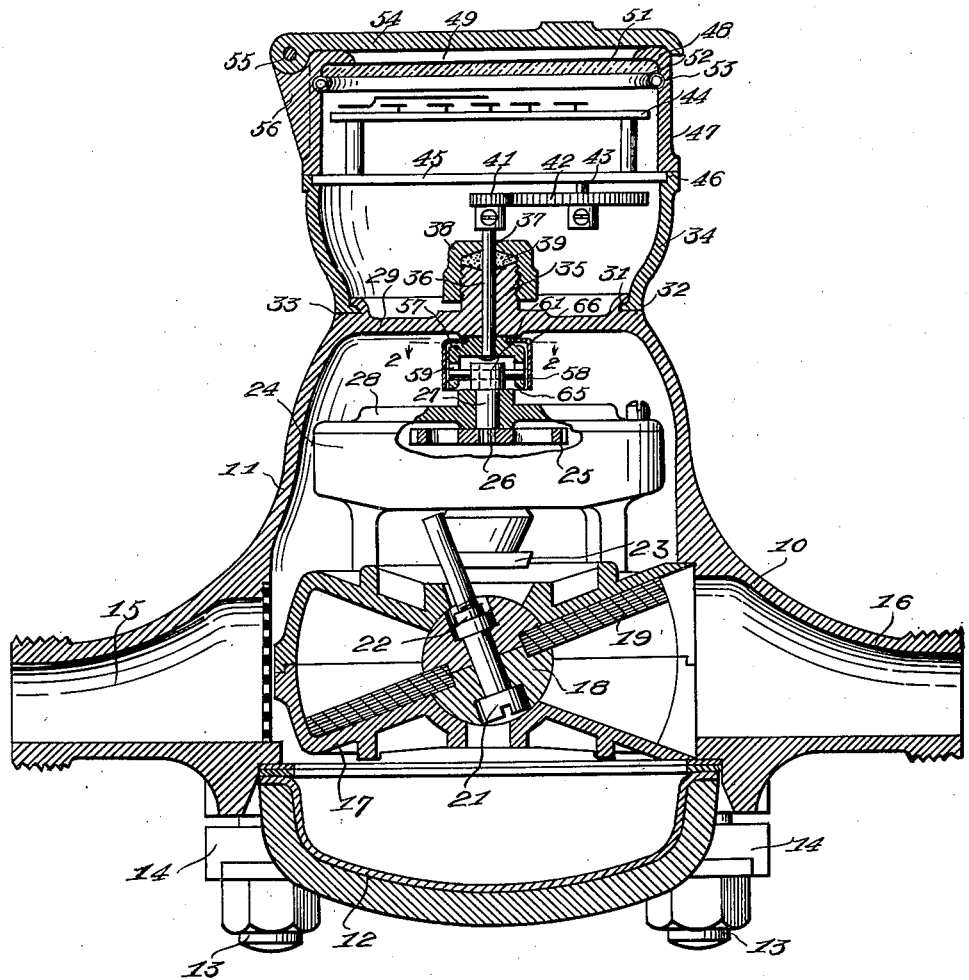
Figure 1 is a longitudinal sectional view of a water meter showing the application of one of the embodiments of my invention thereto.

Referring to the drawings by reference characters in which like characters designate like parts, 10 designates a water meter adapted for service in very cold climates and which in its construction comprises a top or main casing 11 and a bottom casing 12, the two casings being secured together by bolts 13 extending through lugs 14 on bottom casing 12 whereby upon freezing the lugs 14 will break permitting separation of the bottom casing from the top casing in order to avoid serious damage to the meter construction. The casing 11 is provided with terminally threaded inlet and outlet extensions 15 and 16 respectively. between which and within casing 11 is removably positioned the nutating disk chamber 17 in which is mounted the half balls 18 having an annular slot midway between the metering surfaces in which is seated the central portion of the flat nutating disk 19 in well known manner, the half balls being held together by the disk spindle 21 provided with the nut 22, said assembly constituting the meter mechanism.

Removably positioned over the disk chamber 17 is a unitary reducing gear assembly comprising a casing 24 in which is operatively positioned the reducing gears the lower one of which is operatively connected with the disk spindle 21 through a dog 23 carried by the spindle of the lower gear and the upper gear of the reducing gear assembly indicated at 25 in Figure 1 is splined or otherwise connected to the reduced end 26 of the dog crank spindle 27 which is journaled in the removable cover plate 28 of gear casing 24.

The top casing 11 is provided with an integral top or partition 29 provided with an outwardly directed flange member 31 defining an annular seating channel 32 adapted to receive the inwardly flanged base 33 of a casing section 34 through a snap connection the lower portion of casing 34 being slotted to allow it to be snapped over casing 11, thus avoiding the use of screws for the connection of casings 11 and 34. Partition 29 is provided with an integral outwardly directed extension 35 provided with a central bore 36 in which is journaled a spindle 37 in alinement with spindle 27. The extension 35 is externally threaded for engagement of cap nut 38 between which and the outer end of extension 35 is positioned a packing 39 providing a stuffing box through which spindle 37 extends. Secured to the outer end of spindle 37 is the registering mechanism which comprises a pinion 41 meshing with a gear 42 which is connected to a spindle 43 of mechanism 44 which mechanism 44 is supported on a base plate 45 the margin of which is seated in a recess 46 in the outer end of casing 34 and maintained therein by the base of a register box 47 the outer end of which is inwardly flanged at 48 providing an opening 49. The register box 47 may be secured to casing 34 by aligned perforated lugs for the reception of bolts. A register box crystal 51 is disposed inwardly of flange 48 and maintained in engagement therewith by a spring 52 seating in a recess 53 in the inner wall of register box 47. The opening 49 through which the readings of the meter are observed is normally closed by a lid or cover 54 hingedly connected at 55 to lug 56 integral with register box 47.

The spindles 27 and 37 are operatively connected in the following manner. Secured to the inner end of the spindle 37 is the central portion of an elongated crank 57 (Figures 1 and 2) provided with inwardly extending end flanges 58 each provided with a recess 59. The dog crank spindle 27 is provided with a reduced extension 61 disposed between flanges 58 and is transversely apertured at 62. Collar 63 surrounds extension 61 and is provided with diametrically opposite apertures 64 which are alined with aperture 62 and a dog crank in the form of a pin 65 is extended through the alined apertures with the opposite ends thereof normally engaged in recesses 59 of the spindle box crank 57.

The meter construction so far described is a standard water meter and forms no part of the present invention but with which the invention about to be described is utilized. In meters of this character it has been found from experience that in many instances the connection between the reducing gears and the stuffing box spindle embodying the stuffing box crank 57 and the dog crank 65 became frozen thus impeding the movement thereof and resulting in the upper wheel 25 of the reducing gear train coming loose from the spindle 27 thus impairing the operation of the meter and necessitating repairs thereto.

In order to overcome the above noted objections a thimble sleeve 66 with a base portion or upper flat portion secured to the spindle 37, which thimble sleeve embodies one form of my invention said sleeve being provided with a central opening 67 is provided and the lengths of spindles 27 and 37 are reduced to provide clearance for sleeve 66 and also to reduce the area in engagement with the ice when freezing occurs. The sleeve 66 is mounted on the spindle box crank 57 with the opening 67 receiving the hub portion 68 of the crank 57 and with the skirt portion 69 of the sleeve 66 enclosing the spindle crank 57 and dog crank 65 laterally thereof with about 1/64th inch clearance between the skirt portion 69 and the flanges 58 of the spindle crank 57 and with the sleeve 66 having a turning fit around the spindle crank 57.

With this construction the revolvable sleeve 66 as found in actual practice upon freezing of the meters will freeze fast to the ice surrounding the outer surface thereof but the cranks 57 and 65 will continue to rotate within the sleeve 66 no matter how hard the meter is frozen. The ice cylinder formed within the sleeve 66 in surrounding relation to cranks 57 and 65 will be turned within the sleeve by the cranks, as any tendency of adherence of the ice to the inner surface of sleeve 66 will be easily overcome by the movement of cranks 57 and 65 notwithstanding their comparatively slow rate of rotative movement and even should the ice formed within the sleeve 66 adhere to the inner surface thereof it is readily sheared therefrom through rotation of the cranks.

Figure 2:
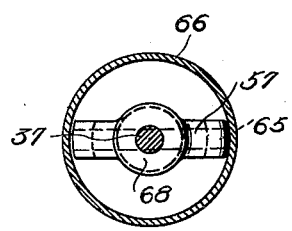
Figure 2 is a transverse sectional view on line 2—2 of Figure 1.
Figure 3:
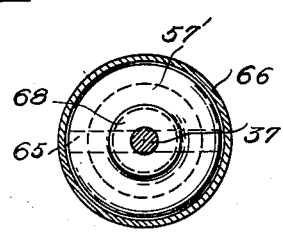
Figure 3 is a view similar to Figure 2 disclosing another embodiment of my invention.

As a modification of the invention shown in Figures 1 and 2 the sleeve 66 may be employed with the circular spindle crank 57′ as illustrated in Figure 3 whereby the tendency of crank 57′ to freeze tight within the surrounding mass of ice will be greatly reduced due to the slight clearance between flange 58′ and sleeve 66 together with the relative movement of these two parts by means of which any ice tending to freeze between flange 58' and sleeve 66 will be broken therefrom by the movement of crank 57'.

In Figures 4 and 5 is illustrated a modification of the invention involving the utilization of a spindle crank 57' which instead of being elongated in form as in usual practice and as illustrated in the first form of the invention is circular in plan as indicated in Figure 5 thus providing an inwardly directed cup shaped member with a cylindrical flange 58'. In this form of the invention the other elements entering into the formation of the drive connection between the gear train and indicating mechanism is the same as in the first form of the invention. In accordance with this form of the invention wherein sleeve 66 is omitted thus providing more simple and cheaper construction, the constant rotation of crank 57' will, due to its cylindrical flange surface avoid freezing fast to the ice formed within casing 11 and ice formed within the cylindrical flange 58' will be cut away from the surrounding mass of ice through movement of the dog crank 65 and consequently will not arrest rotation of crank 57' nor cause injury to the driving connections.

In accordance with the forms of the invention so far described while being effective in operation it will be seen that the inner end of sleeve 66 is open to the circulation of water resulting in an accumulation of ice within the skirt portion 69 of sleeve 66 which in order not to impede the movement of the cranks must be broken away from the surrounding mass of ice by crank 65.

In accordance with the form of the invention disclosed in Figures 6, 7 and 8 a dog crank is provided comprising a disk portion 72 provided with an integral inwardly directed spindle 73 corresponding to spindle 27 in the other forms of the invention, and disk portion 72 is provided with a pair of diametrically disposed apertures 74 in each of which is disposed the reduced shank portion 75 of a pin 76 preferably constructed of monel metal with the pins projecting substantially outward of the outer surface of disk portion 72 as indicated in Figure 8. A spindle crank 77 of elongated formation is secured to spindle 37 and has the rotation of crank 71 imparted thereto by means of pins 76 engaging opposite sides thereof as indicated in Figure 7 in which crank 71 is slowly rotated by the reduction gearing in the direction of the arrow and imparting a like rotation to the crank 77. Sleeve 66 in this form of the invention is provided with a central aperture for reception of spindle 37 providing a rotatable mounting for sleeve 66 in bearing engagement with the hub 77' of crank 77 and with the skirt portion 69 enclosing cranks 71 and 77 with a slight clearance therebetween.

In accordance with this form of the invention the inner end or mouth of sleeve 66 is substantially closed by the disk portion 72 of crank 71 whereby the passage of water into sleeve 66 is substantially restricted as a consequence of which ice formed within the sleeve from the restricted volume of water entering thereinto will be effectively prevented from rigid adherence to the inner wall of 66 by the rotation of crank 77.

From the foregoing disclosure it will be seen that anti-freeze constructions for meters are provided which are simple in construction, efficient in operation and which can be manufactured and installed at relatively little expense.

While I have disclosed certain specific embodiments of my invention, these are to be considered as illustrative only and not restrictive, the scope of my invention being defined by the terms of the appended claims. Accordingly what I claim and desire to secure by U. S. Letters Patent is:

1. In combination with a water meter comprising a casing, metering mechanism within said casing, reduction gearing operatively connected with said metering mechanism, a spindle projecting from one of the gears of said reduction gearing, a dog crank carried by said spindle, registering mechanism supported on said casing, a spindle connected with said registering mechanism and extending through said casing in alinement with said first spindle, a crank connected to said second spindle and operatively engaged with said dog crank, of means for preventing any considerable injurious resistance to movement of said cranks upon the formation of ice therearound.

2. The combination defined in claim 1 in which said means comprises a sleeve surrounding said cranks and independently rotatable relative thereto.

3. The combination defined in claim 1 in which said means comprises a thimble sleeve having a base portion which is rotatably mounted on said second crank and having a skirt portion surrounding both of said cranks in relatively close spaced relation thereto.

4. The combination defined in claim 1 in which said second crank is of circular form and in which said means comprises a sleeve rotatably supported by said second crank and housing both of said cranks.

5. A water meter comprising a casing; metering mechanism in said casing; registering mechanism supported on said casing; and a drive connection between said metering mechanism and said registering mechanism; said drive connection comprising a cup shaped crank whereby the rotative movement of said crank is not injuriously restricted upon the formation of ice adjacent thereto.

6. The combination with the spindle crank and dog crank of a water meter, of means rotatably carried by one of said cranks to protect the connection between the crank from the formation of ice adjacent said crank.

7. The combination defined in claim 6 in which said means comprises a cup shaped member having the base portion thereof rotatably supported on said spindle crank and having a skirt portion thereof surrounding both of said cranks in closely spaced relation thereto.

8. A water meter comprising a casing; metering mechanism within said casing; reduction gearing supported on said metering mechanism and operatively connected therewith; an apertured spindle projecting from the upper gear of said reduction gearing; a pin extending through the apertured spindle; registering mechanism supported on said casing; a spindle operatively connected with said registering mechanism and extending through said casing in alinement with said first spindle; and a cup shaped crank mounted on said second spindle and operatively connected with the opposite ends of said pin.

9. The combination defined in claim 8 together with means associated with said cup shaped crank, to prevent injury to said crank when the meter freezes.

10. The combination defined in claim 8 in which a sleeve member is rotatably supported on said cup shaped crank in surrounding relation thereto and to said pin.

11. A water meter comprising metering mechanism, reduction gearing supported on said metering mechanism and operatively connected therewith, registering mechanism, a drive connection between said reduction gearing and registering mechanism, said drive connection comprising a disk-shaped dog crank, a spindle crank disposed adjacent said dog crank, and pins carried by said dog crank for driving engagement with said spindle crank, and a member rotatably supported by said spindle crank and having a skirt portion extending in closely spaced relation to said dog crank so as to protect said crank upon freezing of water surrounding said member.

12. The combination with a liquid meter mechanism including a reduction gearing, registering mechanism, and a drive connection therebetween, of a hollow member freely rotatable with respect to and partially enclosing said drive connection whereby when the liquid in said meter freezes said drive connection easily breaks loose from the ice surrounding said member, the hollow member separating the ice surrounding said drive connection from the ice in the other parts of the meter.

13. The invention as defined in claim 12 wherein said member comprises a cup-shaped member free to move with respect to said driving connection.

14. The invention as defined in claim 12 wherein said drive connection includes a rotary spindle connected with said registering mechanism, a member connected to said reduction gearing, and a pin connecting said spindle and member together, and in which said collar member is in the form of a cup rotatably mounted on said spindle and formed to house said pin and member.

In testimony whereof I affix my signature.

HARRY G. WEYMOUTH.